United States Patent
Horianopoulos et al.

(10) Patent No.: US 10,408,195 B2
(45) Date of Patent: Sep. 10, 2019

(54) RAILROAD KINETIC ENERGY HARNESSING APPARATUS

(71) Applicant: KINERGYPOWER INTERNATIONAL CORP., Welland (CA)

(72) Inventors: Dimitrios Horianopoulos, Athens (GR); Stefanos Horianopoulos, Welland (CA)

(73) Assignee: KINERGYPOWER INTERNATIONAL CORP., Welland (CA)

( * ) Notice: Subject to any disclaimer, the term of this patent is extended or adjusted under 35 U.S.C. 154(b) by 507 days.

(21) Appl. No.: 14/784,733

(22) PCT Filed: Apr. 15, 2014

(86) PCT No.: PCT/CA2014/050375
§ 371 (c)(1),
(2) Date: Oct. 15, 2015

(87) PCT Pub. No.: WO2014/169385
PCT Pub. Date: Oct. 23, 2014

(65) Prior Publication Data
US 2016/0061193 A1 Mar. 3, 2016

Related U.S. Application Data

(60) Provisional application No. 61/811,926, filed on Apr. 15, 2013.

(51) Int. Cl.
*F03G 7/08* (2006.01)
*B61K 13/00* (2006.01)
(Continued)

(52) U.S. Cl.
CPC .................. *F03G 7/08* (2013.01); *B60T 1/02* (2013.01); *B60T 1/10* (2013.01); *B60T 3/00* (2013.01);
(Continued)

(58) Field of Classification Search
CPC . F02B 63/04; F03G 7/08; E01B 26/00; E01B 9/66; B60M 1/30
(Continued)

(56) References Cited

U.S. PATENT DOCUMENTS

| | | |
|---|---|---|
| 159,660 A | 2/1875 | Faivre |
| 1,391,503 A | 9/1921 | Register |

(Continued)

FOREIGN PATENT DOCUMENTS

| | | |
|---|---|---|
| GB | 2290115 A | 12/1995 |
| GB | 2408074 A | 5/2005 |

(Continued)

OTHER PUBLICATIONS

Written Opinion dated Jul. 15, 2014 and International Search Report dated Jul. 24, 2014 in respect of International Application No. PCT/CA2014/050375.

*Primary Examiner* — Nathaniel E Wiehe
*Assistant Examiner* — Richard C Drake
(74) *Attorney, Agent, or Firm* — Bereskin & Parr LLP/S.E.N.C.R.L., s.r.l.

(57) ABSTRACT

An apparatus for harnessing energy from a wheel travelling on a railroad track includes an elongate body with a plurality of pockets spaced apart along a top surface thereof. Energy collection devices are installed in the pockets, and each includes an actuator extending proud of the top surface. A mounting assembly releasably mounts the body adjacent to the railroad track so that the actuators of the energy collection devices are positioned in a path of the wheel to be (Continued)

actuated thereby. The energy collection devices may be coupled to a low pressure fluid supply reservoir and a high pressure fluid accumulator, and used to pump fluid from the reservoir to the accumulator upon actuation.

14 Claims, 9 Drawing Sheets

(51) Int. Cl.
| | |
|---|---|
| *E01B 26/00* | (2006.01) |
| *E01B 5/00* | (2006.01) |
| *F16D 61/00* | (2006.01) |
| *E01B 5/02* | (2006.01) |
| *B60T 1/02* | (2006.01) |
| *B60T 1/10* | (2006.01) |
| *B60T 3/00* | (2006.01) |
| *B61H 9/06* | (2006.01) |
| *B61D 43/00* | (2006.01) |

(52) U.S. Cl.
CPC .............. *B61D 43/00* (2013.01); *B61H 9/06* (2013.01); *B61K 13/00* (2013.01); *E01B 5/00* (2013.01); *E01B 5/02* (2013.01); *E01B 26/00* (2013.01); *F16D 61/00* (2013.01); *Y02T 30/36* (2013.01)

(58) Field of Classification Search
USPC ............... 104/26.2; 238/1, 14.05, 14.3, 281; 290/45
See application file for complete search history.

(56) References Cited

U.S. PATENT DOCUMENTS

| | | | |
|---|---|---|---|
| 1,771,200 A | 7/1930 | Akers | |
| 1,916,873 A | 7/1933 | Wiggins | |
| 2,020,361 A | 11/1935 | Johnston | |
| 2,060,890 A | 11/1936 | Olafson | |
| 2,333,614 A | 11/1943 | Boyd | |
| 3,059,884 A * | 10/1962 | Stanfill | B61L 25/04 238/14.05 |
| 3,088,417 A | 5/1963 | Johnston | |
| 3,581,084 A * | 5/1971 | Kaneno | B61L 1/025 246/248 |
| 3,803,422 A | 4/1974 | Krickler | |
| 3,944,855 A | 3/1976 | Le Van | |
| 4,004,422 A | 1/1977 | Le Van | |
| 4,081,224 A | 3/1978 | Krupp | |
| 4,130,064 A | 12/1978 | Bridwell | |
| 4,173,431 A * | 11/1979 | Smith | F03B 13/24 417/229 |
| 4,198,909 A * | 4/1980 | Plantureux | B61K 7/08 104/26.2 |
| 4,211,078 A | 7/1980 | Bass | |
| 4,212,598 A | 7/1980 | Roche et al. | |
| 4,238,687 A | 12/1980 | Martinez | |
| 4,239,974 A | 12/1980 | Swander et al. | |
| 4,239,975 A | 12/1980 | Chiappetti | |
| 4,322,673 A | 3/1982 | Dukess | |
| 4,339,920 A | 7/1982 | Le Van | |
| 4,409,489 A | 10/1983 | Hayes | |
| 4,418,542 A | 12/1983 | Ferrell | |
| 4,437,015 A | 3/1984 | Rosenblum | |
| 4,614,875 A | 9/1986 | McGee | |
| 4,650,038 A * | 3/1987 | Bick | B61K 7/025 188/62 |
| 4,700,540 A | 10/1987 | Byrum | |
| 4,739,179 A | 4/1988 | Stites | |
| 4,980,572 A | 12/1990 | Sen | |
| 5,092,248 A * | 3/1992 | Parry | B61K 7/02 104/162 |
| 5,157,922 A | 10/1992 | Baruch | |
| 5,355,674 A | 10/1994 | Rosenberg | |
| 5,582,371 A * | 12/1996 | Humphrey | E01B 7/02 238/338 |
| 5,634,774 A | 6/1997 | Angel et al. | |
| 6,091,159 A | 7/2000 | Galich | |
| 6,172,426 B1 | 1/2001 | Galich | |
| 6,204,568 B1 | 3/2001 | Runner | |
| 6,353,270 B1 | 3/2002 | Sen | |
| 6,362,534 B1 | 3/2002 | Kaufman | |
| 6,376,925 B1 | 4/2002 | Galich | |
| 6,734,575 B2 * | 5/2004 | Ricketts | F03G 7/08 290/1 R |
| 6,756,694 B2 * | 6/2004 | Ricketts | F03G 7/08 290/1 R |
| 6,767,161 B1 | 7/2004 | Calvo et al. | |
| 6,858,952 B2 | 2/2005 | Gott et al. | |
| 6,860,674 B2 | 3/2005 | Solon | |
| 6,936,932 B2 | 8/2005 | Kenney | |
| 6,949,840 B2 | 9/2005 | Ricketts | |
| 7,032,829 B2 * | 4/2006 | Schwarzbich | E01B 9/66 238/281 |
| 7,145,257 B2 * | 12/2006 | Ricketts | F03G 7/08 290/1 R |
| 7,239,031 B2 * | 7/2007 | Ricketts | F03G 7/08 290/1 A |
| 7,429,145 B2 | 9/2008 | Rastegar et al. | |
| 7,629,698 B2 * | 12/2009 | Horianopoulos | F03G 7/08 290/1 R |
| 7,717,004 B2 * | 5/2010 | Kumar | B61L 1/08 73/866.5 |
| 8,310,070 B2 * | 11/2012 | Brand | F03G 7/08 290/1 E |
| 8,678,297 B2 * | 3/2014 | Schatz | F16B 2/12 238/14.05 |
| 8,733,027 B1 * | 5/2014 | Marston | F24J 2/5249 24/525 |
| 9,175,880 B2 * | 11/2015 | Park | F24J 2/5232 |
| 2003/0051592 A1 * | 3/2003 | Molburg | B23Q 9/0042 83/745 |
| 2003/0132636 A1 | 7/2003 | Ricketts | |
| 2003/0132637 A1 | 7/2003 | Ricketts | |
| 2004/0130158 A1 | 7/2004 | Kenney | |
| 2005/0200132 A1 | 9/2005 | Kenney | |
| 2006/0001267 A1 | 1/2006 | Ricketts | |
| 2006/0006653 A1 | 1/2006 | Ricketts | |
| 2006/0032933 A1 * | 2/2006 | Reichle | B60M 1/30 238/14.05 |
| 2006/0032934 A1 * | 2/2006 | Reichle | B60M 1/30 238/14.05 |
| 2007/0085342 A1 | 4/2007 | Horianopoulos et al. | |
| 2007/0210179 A1 * | 9/2007 | Young | E01B 9/303 238/351 |
| 2007/0272762 A1 * | 11/2007 | Click | E01B 11/54 238/14.05 |
| 2009/0309370 A1 | 12/2009 | Brand et al. | |
| 2010/0013229 A1 | 1/2010 | Da Costa | |
| 2010/0156015 A1 * | 6/2010 | Klein | B25B 5/102 269/166 |
| 2010/0170955 A1 * | 7/2010 | Igwemezie | E01B 9/303 238/14.05 |
| 2012/0321383 A1 * | 12/2012 | Sieger | E01C 5/00 404/71 |
| 2015/0361967 A1 * | 12/2015 | Gallelli | F03G 7/08 60/530 |
| 2017/0159243 A1 * | 6/2017 | Campman | E01B 26/00 |

FOREIGN PATENT DOCUMENTS

| | | |
|---|---|---|
| KR | 1020060002414 A | 1/2006 |
| WO | 2009/098673 A1 | 8/2009 |
| WO | 2014/169384 A1 | 10/2014 |

* cited by examiner

FIG. 9

RAILROAD KINETIC ENERGY HARNESSING APPARATUS

CROSS-REFERENCE TO RELATED APPLICATION

This is a national stage application of International Application No. PCT/CA2014/050375 filed on Apr. 15, 2014, which claims priority to U.S. Provisional Application No. 61/811,926 filed on Apr. 15, 2013, and the entire contents of each are hereby incorporated herein by reference.

TECHNICAL FIELD

The present disclosure relates generally to a railroad kinetic energy harnessing apparatus in which energy from a passing train is used to provide a supply of pressurized fluid.

BACKGROUND

U.S. Pat. No. 4,739,179 describes a system for generating power by vehicular movement having treadle plates upon which a vehicle overpasses. Treadle plates are pivotally fitted to the top of the vertical shafts. Resilient, compressible bladders are each fitted with an inlet and an exhaust, pressure plates for compressing the bladders, a series of connecting links, fulcrums, levers and arms, directly or indirectly attached to the lower portion of the vertical shafts and also to the pressure plates, and a generating means for converting the compressed fluid into electricity. As the vehicle overpasses the treadle plates, the vertical shafts are forced downwardly, and, accordingly, force is applied to the upper and lower plates via the linking system, thus compressing the bladder and the working fluid therein. The compressed fluid is then driven through pipelines into the generator, causing the production of power. In an alternate embodiment, cylinders and pistons are substituted for the bladders, and upon the overpass of a vehicle, the vertical shafts are forced downward, the pistons are forced into the cylinders, and the resulting compressed fluid is expelled to the generating means.

U.S. Pat. No. 6,091,159 describes an electrical energy producing platform system to generate electrical energy from the wasted existing motion and weight of vehicles and trains. In the first embodiment, the system comprises a deformable bladder containing a volume of hydraulic fluid and compressible from the weight of a moving vehicle. As a vehicle is driven over the bladder, the bladder compresses and forces the hydraulic fluid into a circulation assembly in fluid communication with the bladder. The circulation assembly converts the energy of the hydraulic fluid into mechanical energy which in turn is used to power a generator to thereby generate electrical energy. In the second embodiment, the deformable bladder is compressed by a beam driven thereover by a moving vehicle. It is contemplated in a third embodiment that a plurality of beams are depressed toward the road by a vehicle driven thereover. In the third embodiment, the beams are mechanically coupled to a hydraulic cylinder which translates the movement of the beams to a hydraulic cylinder that forces the hydraulic fluid to a circulation assembly to thereby produce electrical energy. In the fourth embodiment, a deformable bladder containing a volume of hydraulic fluid is disposed adjacent to a rail of a railroad track. The wheel of a train compresses the bladder to thereby force the hydraulic fluid into a circulation assembly which produces electrical energy therefrom. Therefore, the system converts the untapped motion of vehicles and trains to produce a clean and economical source of alternative electrical energy.

U.S. Pat. No. 7,629,698 describes a traffic-actuated power generating apparatus that includes a low pressure fluid supply reservoir, a high pressure fluid accumulator, and at least one energy collection device positioned in the path of oncoming traffic to be actuated thereby and pump fluid from the reservoir to the accumulator upon actuation. The energy collection device can be housed in a pad adapted to rest on a traffic-conveying surface, and fluid from the accumulator can be used to drive an electrical power generator.

INTRODUCTION

The following is intended to introduce the reader to the more detailed description that follows and not to define or limit the claimed subject matter.

In an aspect of the present disclosure, an apparatus for harnessing energy from a wheel travelling on a railroad track may include: an elongate body extending lengthwise along a body axis, the body including a top surface, and a plurality of pockets spaced apart along the top surface in general alignment with the body axis; a plurality of energy collection devices, each of the energy collection devices installed in a respective one of the pockets of the body, and including an actuator extending proud of the top surface of the body; and a mounting assembly for releasably mounting the body adjacent to the railroad track so that the actuators of the energy collection devices are positioned in a path of the wheel to be actuated thereby.

The mounting assembly may include at least one bracket connected to the body, and at least one first plate releasably connected to the bracket. The bracket and the first plate may be configured to clamp a base portion of the railroad track to fix the body relative to the railroad track. The bracket and the first plate may be configured to clamp the base portion at an opposite side of the railroad track from the body. The bracket may include a first end connected to the body, and a second end spaced apart from an inner side of the body to accommodate the railroad track therebetween. The first end of the bracket may be fastened to an outer side of the body. The first plate may be positionable relative to the bracket between an unclamped position, and a clamped position in which a gap between a lower surface of the first plate and an upper surface of the bracket is decreased. In the clamped position, the lower surface of the first plate and the upper surface of the bracket may be arranged to opposingly bear against the base portion of the railroad track. The mounting assembly may include a second plate secured to the second end of the bracket, and, in the clamped position, the first plate may be fastened to the second plate. An inner edge of the first plate may be offset inwardly relative to the second plate, for bearing against the base portion of the railroad track.

The energy collection devices may be configured to convert kinetic energy from the wheel to potential energy in the form of high pressure fluid. Each of the energy collection devices may include a cylinder and a piston slidably mounted therein, the piston coupled to the respective actuator. For each of the energy collection devices, the piston may be movable between an advanced position in which an upper contact surface of the actuator is positioned in the path of the wheel and a retracted position in which the wheel depresses the upper contact surface. For each of the energy collection devices, the cylinder may be formed by the respective pocket of the body. Each of the energy collection devices may include a sleeve fixed to the respective pocket adjacent to the top surface of the body, the sleeve configured to guide the respective piston between the advanced and retracted positions.

An outer side of the body may include, for each of the energy collection devices, at least one port for delivering the high pressure fluid from the cylinder and receiving low pressure fluid into the cylinder. For each of the energy collection devices, the at least one port may include an exhaust port for delivering the high pressure fluid from the cylinder and an intake port for receiving low pressure fluid into the cylinder.

The apparatus may further include a first manifold in fluid communication with each of the cylinders to collect the high pressure fluid therefrom. The first manifold may include an outlet coupling to facilitate detachable connection with a supply line. The apparatus may further include, for each of the energy collection devices, a first check valve connected between the first manifold and the respective cylinder and configured to permit flow of the high pressure fluid out of the cylinder into the first manifold. The apparatus may further include a second manifold in fluid communication with each of the cylinders to distribute the low pressure fluid thereto. The second manifold may include an outlet coupling to facilitate detachable connection with a return line. The apparatus may further include, for each of the energy collection devices, a second check valve connected between the second manifold and the respective cylinder and configured to permit flow of the low pressure fluid out of the second manifold into cylinder.

In an aspect of the present disclosure, a system for harnessing kinetic energy from a wheel travelling on a railroad track may include: at least one of the apparatus described herein; a low pressure fluid supply reservoir; and a high pressure fluid accumulator, wherein the energy collection devices pump fluid from the reservoir to the accumulator upon actuation.

The system may further include an electrical power generator driven by fluid from the accumulator. The reservoir may be maintained with a backpressure to bias the actuator of each of the energy collection devices towards an advanced position. The fluid may be hydraulic fluid, air or water.

In an aspect of the present disclosure, a method of harnessing kinetic energy from a wheel travelling on a railroad track may include: mounting at least one of the apparatus described herein on the railroad track; coupling the energy collection devices to a low pressure fluid supply reservoir and a high pressure fluid accumulator; and directing the wheel along the railroad track over the body so that a flange of the wheel depresses the actuators and causes the energy collection devices to pump fluid from the reservoir to the accumulator.

The method may further include driving an electrical power generator by fluid from the accumulator. The method may further include maintaining the reservoir with a backpressure to bias the actuator of each of the energy collection devices towards an advanced position. The fluid may be hydraulic fluid, air or water.

In an aspect of the present disclosure, a railroad track may include: a head portion including an upper surface; and a plurality of energy collection devices installed lengthwise along the head portion, wherein each of the energy collection devices includes an actuator that is positioned in a path of a wheel travelling along the railroad track to be depressed thereby, and wherein the energy collection devices are configured to convert kinetic energy from the wheel to potential energy in the form of high pressure fluid.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Various apparatuses or methods are described below to provide an example of an embodiment of each claimed invention. No example described below limits any claimed invention and any claimed invention may cover apparatuses and methods that differ from those described below. The claimed inventions are not limited to apparatuses and methods having all of the features of any one apparatus or method described below or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, and the applicant(s), inventor(s) and/or owner(s) do not intend to abandon, disclaim or dedicate to the public any such invention by its disclosure in this document.

Figure 1:
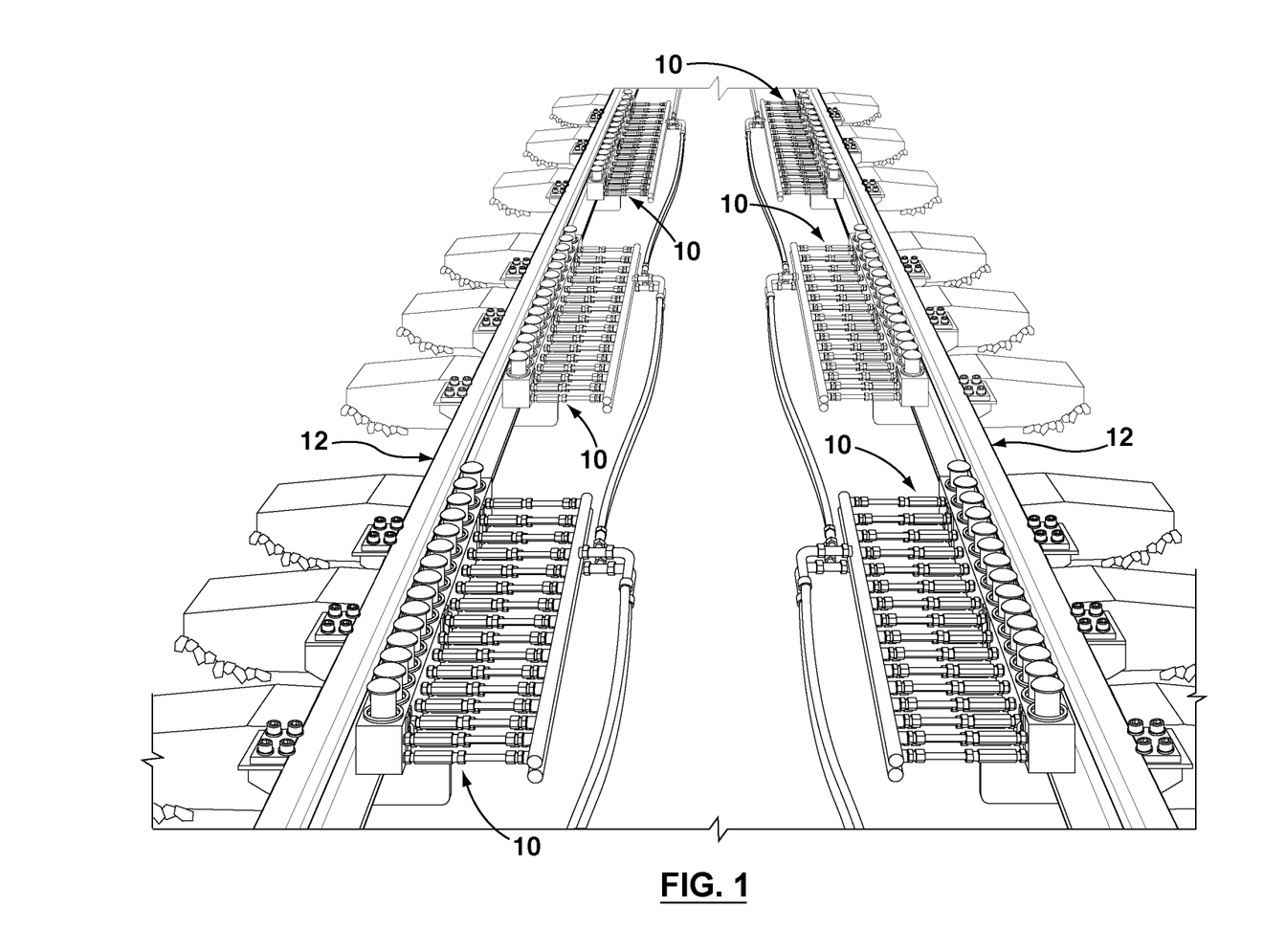
FIG. 1 is a perspective view of energy harnessing apparatuses mounted to a railroad track.

Referring to FIG. 1, apparatuses for harnessing kinetic energy are illustrated generally at reference numeral 10. The apparatuses 10 are shown mounted adjacent to a railroad track 12. The apparatuses 10 are positioned in a path of a wheel (not shown) travelling along the railroad track 12.

Figure 2:
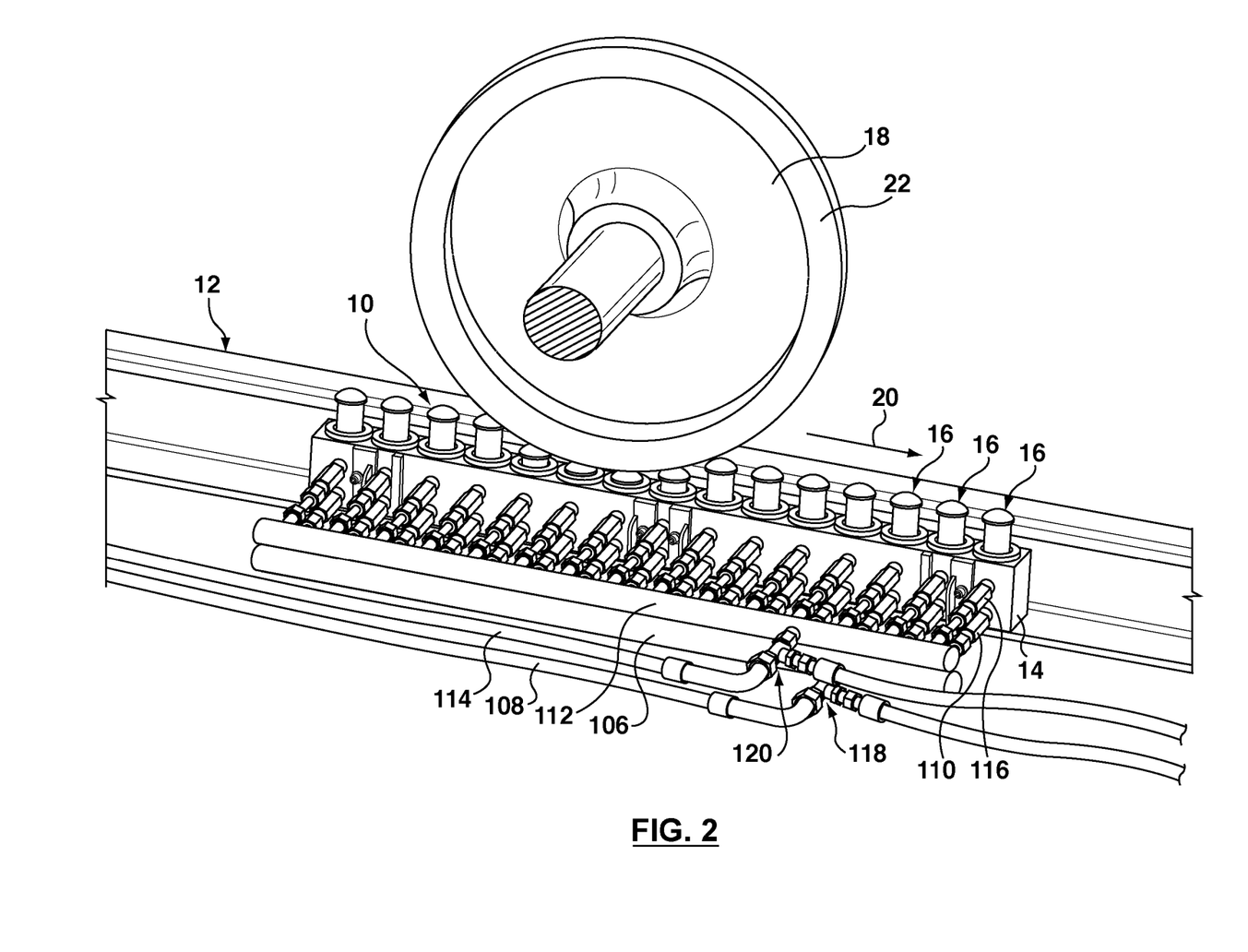
FIG. 2 is a perspective view of one of the energy harnessing apparatuses of FIG. 1 mounted to the railroad track, and a wheel travelling on the railroad track.

Referring now to FIG. 2, the apparatus 10 includes an elongate body 14, and energy collection devices 16 installed lengthwise along the body 14. In the example illustrated, the apparatus 10 includes fifteen of the energy collection devices 16, but the number may be varied.

A wheel 18 is directed along the railroad track 12 in a direction 20, over the body 14. A flange 22 of the wheel 18 actuates the energy collection devices 16 as it travels along the railroad track 12. In the example illustrated, the flange 22 sequentially depresses the energy collection devices 16 as the wheel 18 travels along the railroad track 12. The energy collection devices 16 may convert kinetic energy from the wheel 18 to potential energy in the form of high pressure fluid, as described in further detail herein.

Figure 3:
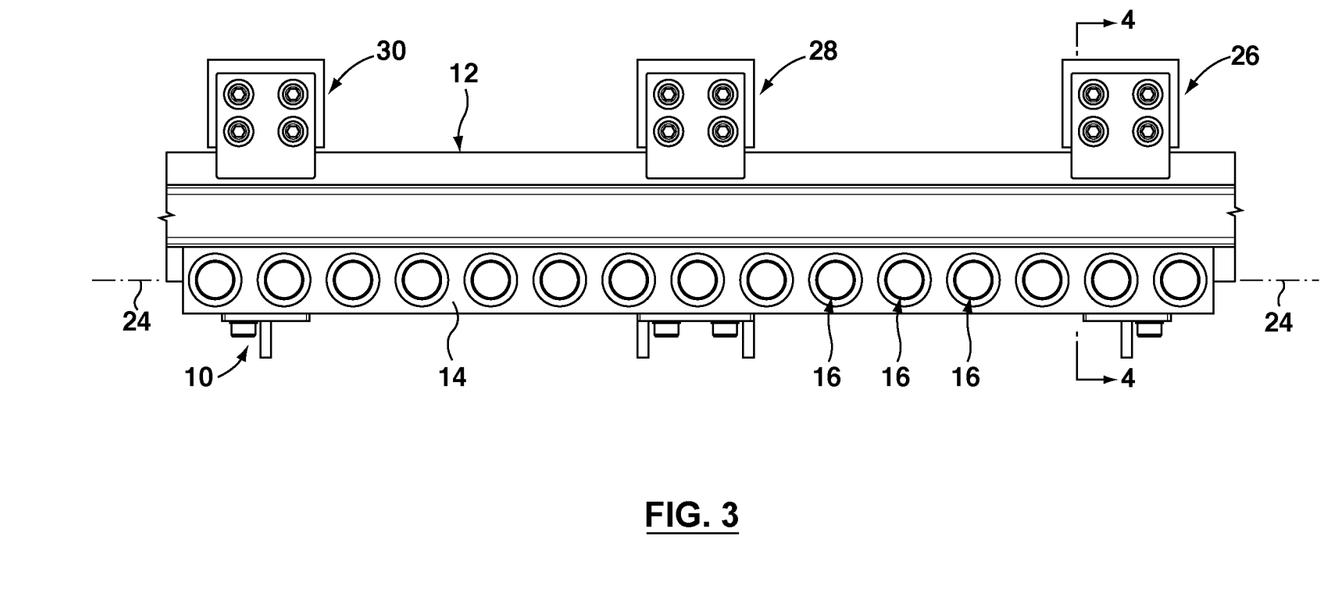
FIG. 3 is a top view of one of the energy harnessing apparatuses of FIG. 1 mounted to the railroad track.

Referring to FIG. 3, the body 14 of the apparatus 10 extends lengthwise along a body axis 24. The energy collection devices 16 are spaced apart along the body 14, in general alignment with the body axis 24.

In the example illustrated, the apparatus 10 includes first, second and third mounting assemblies 26, 28, 30. The mounting assemblies 26, 28, 30 are spaced apart from one another along the body 14. The mounting assemblies 26, 28, 30 mount the body 14 adjacent to the railroad track 12, so that the apparatus 10 may be installed relatively quickly, and on a temporary basis without having to alter the railroad track 12. Further details of the mounting assembly 26 are illustrated FIGS. 4 and 5, and it should be appreciated that the mounting assemblies 28, 30 may be similar in construction to the mounting assembly 26.

Figure 4:
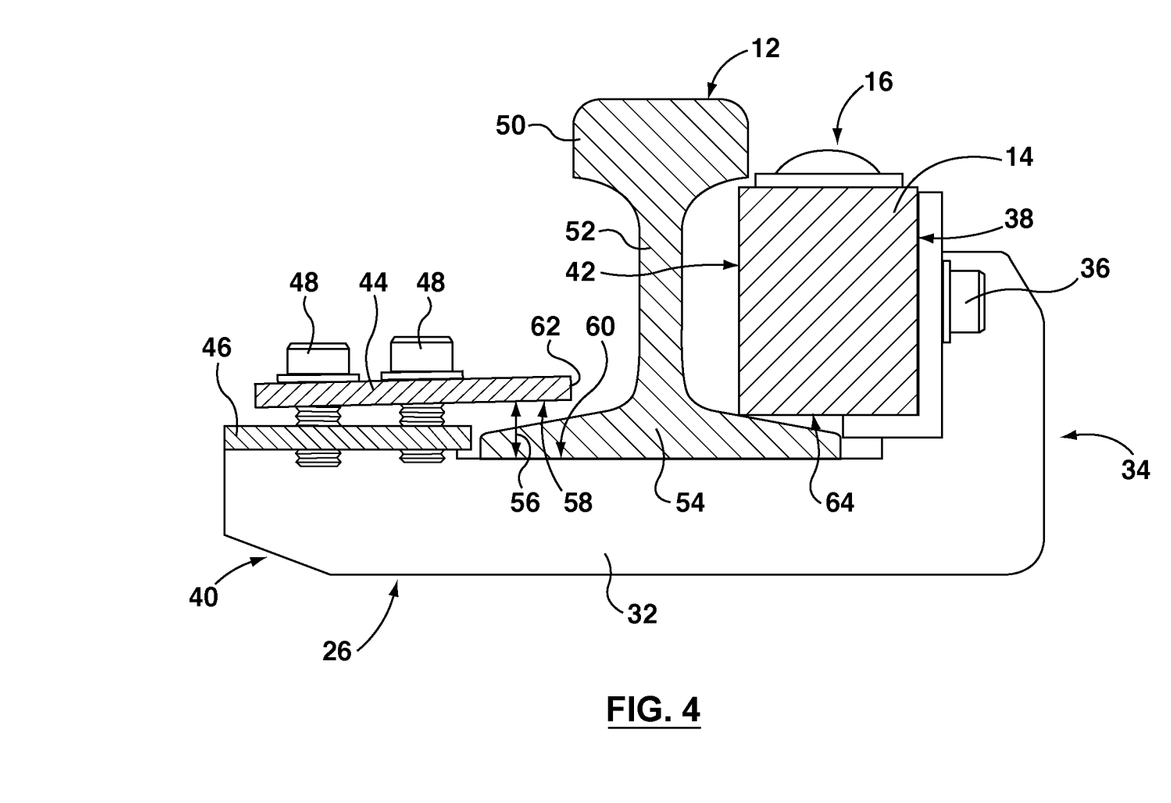
FIGS. 4 and 5 are sectional views along line 4-4 in FIG. 3.

Referring now to FIG. 4, the mounting assembly 26 includes a bracket 32 connected to the body 14. In the example illustrated, a first end 34 of the bracket 32 is fastened by a fastener 36 to an outer side 38 of the body 14. The bracket 32 extends underneath the railroad track 12 to a second end 40. The second end 40 of the bracket 32 is spaced apart from an inner side 42 of the body 14, and accommodates the railroad track 12 therebetween.

In the example illustrated, the mounting assembly 26 includes first and second plates 44, 46. The second plate 46 is secured to the second end 40 of the bracket 32. The first and second plates 44, 46 are releasably fastened together with fasteners 48.

In the example illustrated, the railroad track 12 includes a head portion 50, a web portion 52 and a base portion 54. The bracket 32 and the first plate 44 clamp the base portion 54, at an opposite side of the railroad track 12 from the body 14.

Figure 5:
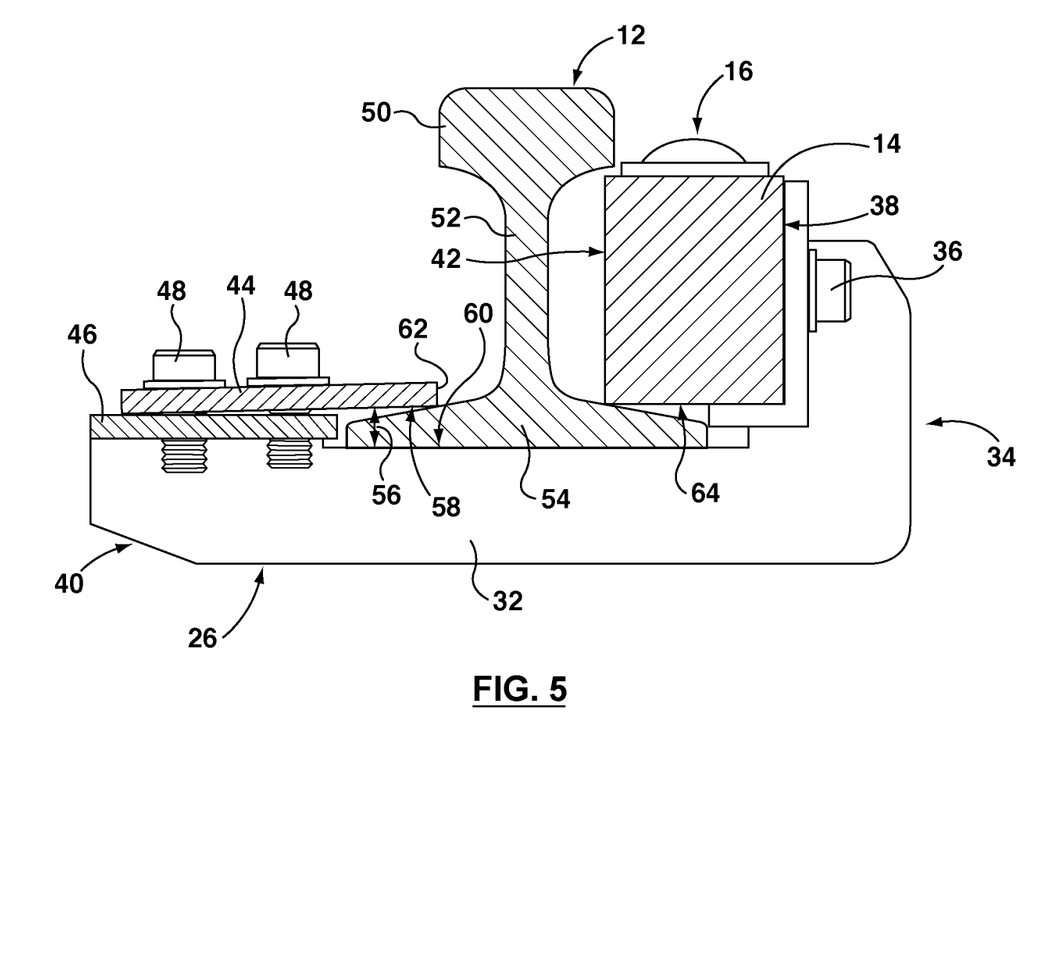

FIG. 4 shows the first plate 44 in an unclamped position relative to the bracket 32, and FIG. 5 shows the first plate 44 in a clamped position relative to the bracket 32. By comparing FIG. 4 with FIG. 5, it may be seen that, in moving from the unclamped position to the clamped position, a gap 56 between a lower surface 58 of the first plate 44 and an upper surface 60 of the bracket 32 is decreased. The lower surface 58 of the first plate 44 and the upper surface 60 of the bracket 32 opposingly bear against the base portion 54 of the railroad track, and the mounting assembly 26 fixes the body 14 relative to the railroad track 12.

Referring to FIG. 5, in the clamped position, an inner edge 62 of the first plate 44 is offset inwardly relative to the second plate 46, and bears directly against the base portion 54. On the other side of the railroad track 12, a bottom surface 64 of the body 14 bears against the base portion 54. The upper surface 60 of the bracket 32 may connect solidly with the base portion 54 across its width.

Figure 6:
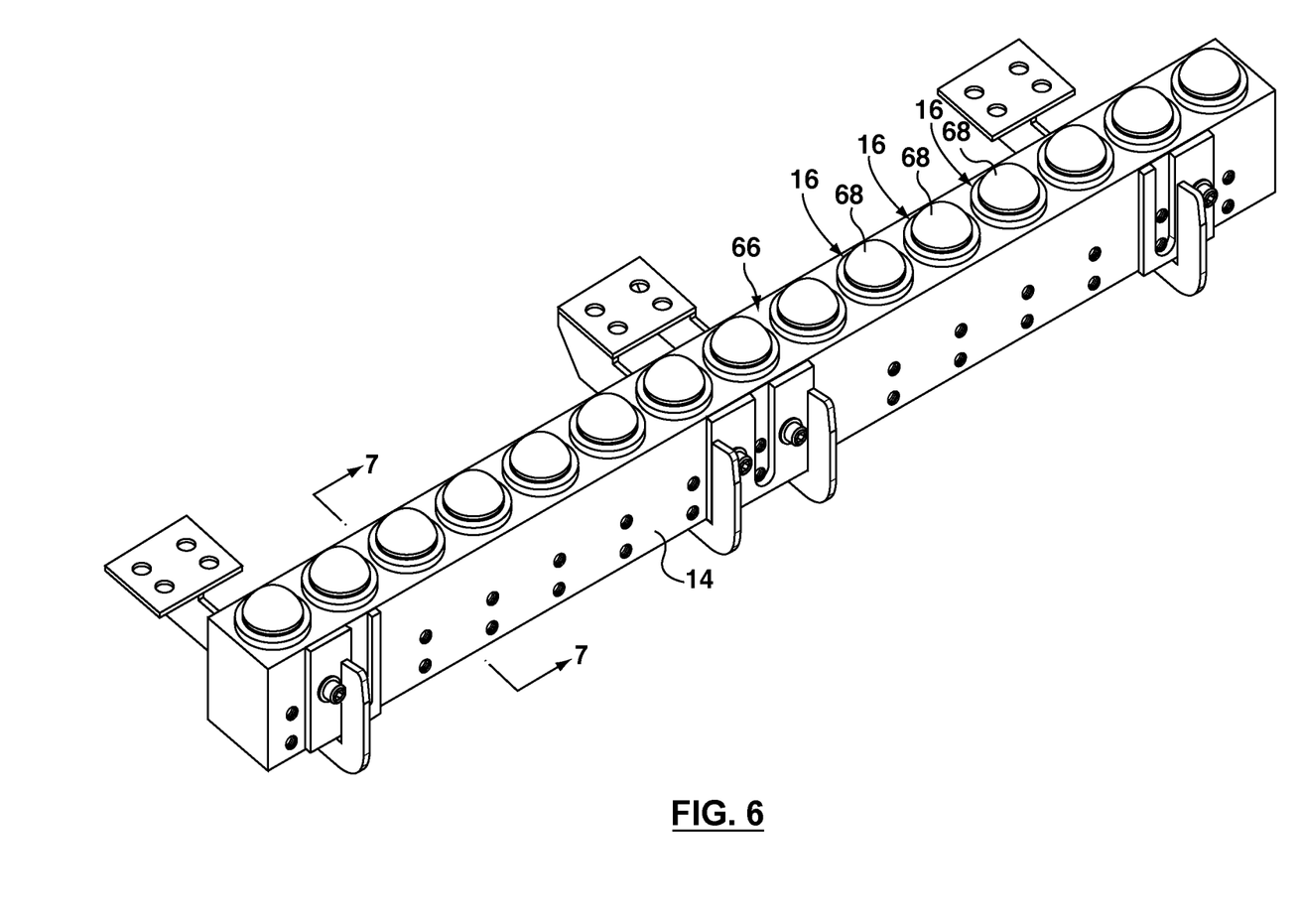
FIG. 6 is a perspective view one of the energy harnessing apparatuses of FIG. 1 removed from the railroad track.

Referring now to FIG. 6, the body 14 includes a top surface 66, and each of the energy collection devices 16 includes an actuator 68 that extends proud of (or protrudes above) the top surface 66.

Figure 7:
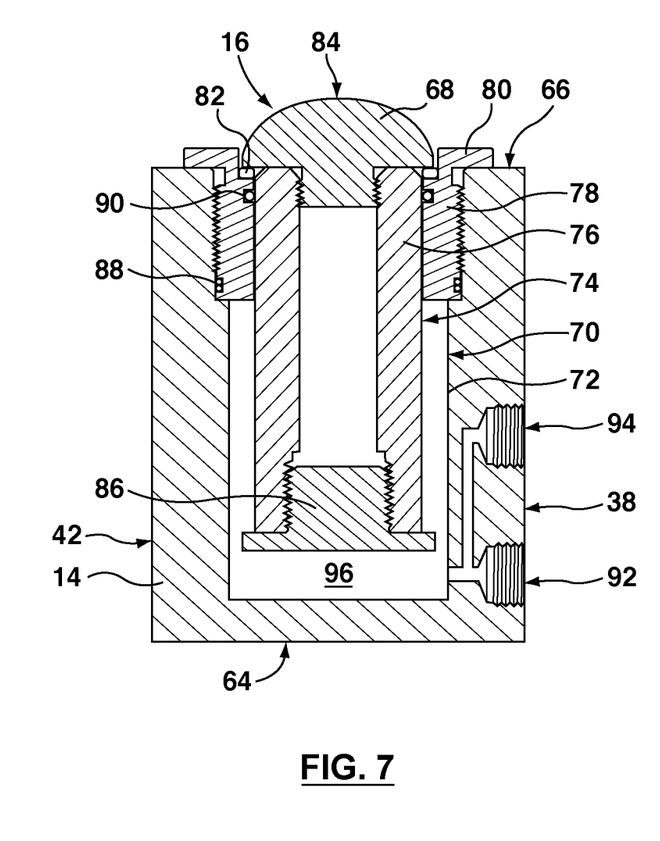
FIG. 7 is a sectional view along line 7-7 in FIG. 6.

Referring now to FIG. 7, the body 14 includes a pocket 70 that is open to the top surface 66. The energy collection device 16 is installed in the pocket 70, and is shown to include a cylinder 72, and a piston 74. In the example illustrated, the cylinder 72 is formed by the pocket 70 of the body 14. In other examples, the cylinder may be formed as a separate component, inserted into the pocket 70.

In the example illustrated, the piston 74 includes a shaft 76. The shaft 76 slides relative to a sleeve 78. The sleeve 78 is fixed to the pocket 70 adjacent to the top surface 66 of the body 14. The sleeve 78 guides the piston 74 between retracted and advanced positions. The sleeve 78 includes a rim 80 extending about the actuator 68. An annular cushion 82 may be provided along an interior of the rim 80 for contacting an outer, bottom edge of the actuator 68. O-rings 88 may provide a fluid seal between the pocket 70 and the sleeve 78, and an O-ring 90 may provide a fluid seal between the shaft 76 and the sleeve 78.

In the example illustrated, the actuator 68 is secured to an upper end of the shaft 76. An upper contact surface 84 of the actuator 68 rises proud of (or protrudes above) the rim 80. The upper contact surface 84 may be curved or convex in shape to provide gentle engagement with the wheel, and may be formed of hardened steel. A plug 86 is secured to a lower end of the shaft 76. The plug 86 may be sized and shaped to move within the cylinder 72, but interfere with a lower surface of the sleeve 78 to prevent the piston 74 from being ejected from the pocket 70.

In the example illustrated, the outer side 38 of the body 14 includes first and second ports 92, 94, which are in fluid communication with an interior 96 of the cylinder 72. One of the ports 92, 94 may be an exhaust port for delivering high pressure fluid out of the interior 96, and one of the ports 92, 94 may be an intake port for receiving low pressure fluid into the interior 96. In other examples, only a single port may be provided.

Figure 8:
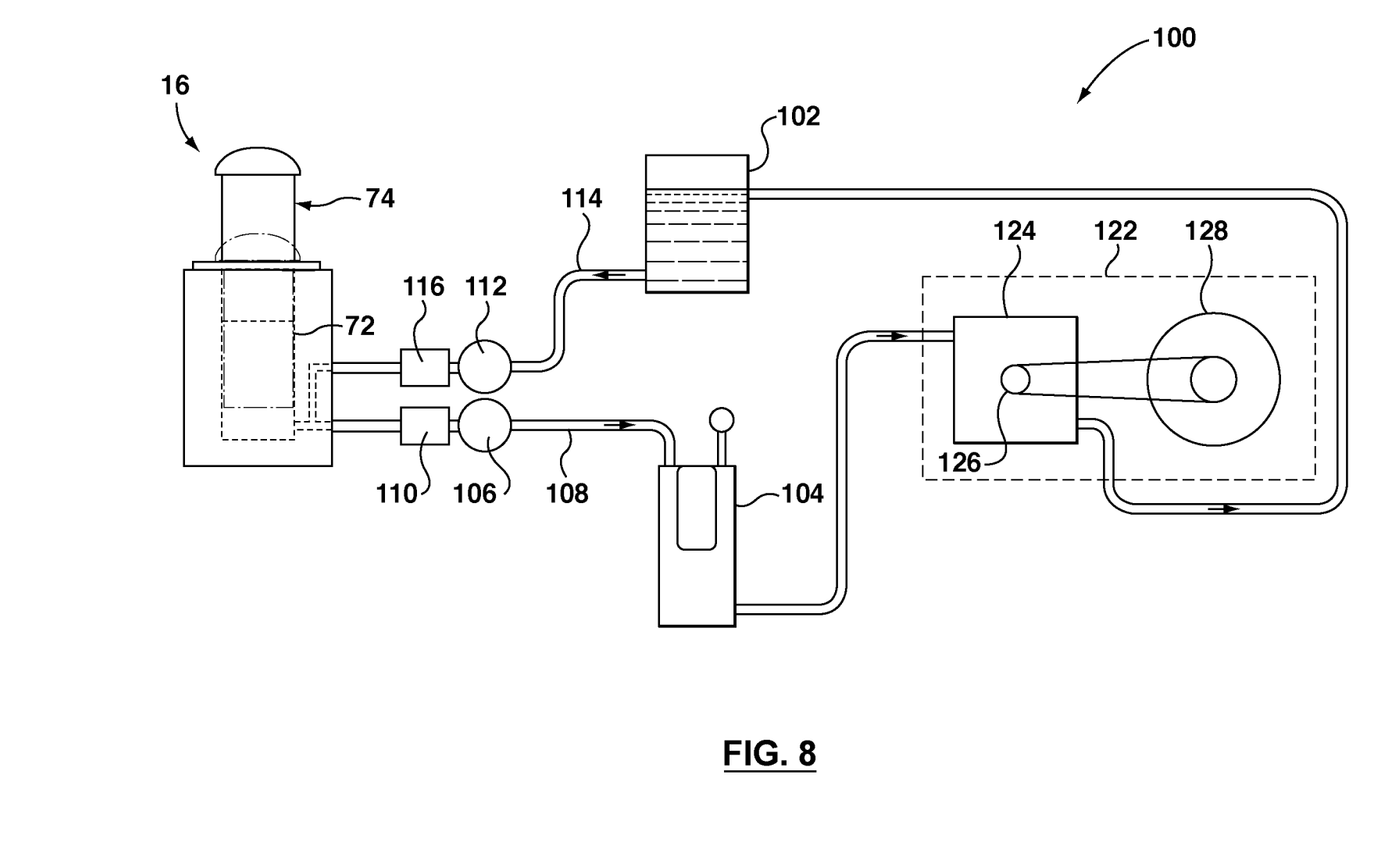
FIG. 8 is a schematic diagram of a system for harnessing energy.

Referring to FIG. 8, a system for harnessing energy is illustrated generally at reference numeral 100. The system 100 includes a low pressure fluid supply reservoir 102, and a high pressure fluid accumulator 104.

The piston 74 is slidable within the cylinder 72 between a retracted position (raised position, shown in solid line) and an advanced position (lowered position, shown in chain dotted line). Upon actuation, the piston 74 moves from the retracted position to the advanced position, and the energy collection device 16 pumps high pressure fluid to the accumulator 104. Thus, kinetic energy of a passing train is converted, by the energy collection device 16, into potential energy in the form of high pressure fluid delivered to the accumulator 104. Upon release, the piston 74 moves from the advanced position to the retracted position, and the energy collection device 16 draws low pressure fluid from the reservoir 102.

The fluid used in the system 100 may be generally incompressible and stable over a wide range of operating temperatures. In some examples, the fluid may be hydraulic fluid, such as suitable hydraulic oil. In other examples, the fluid may be air, or water.

In the example illustrated, a first manifold 106 collects high pressure fluid from the cylinder 72. A supply line 108 supplies the high pressure fluid to the accumulator 104. A first check valve 110 may be connected between the first manifold 106 and the cylinder 72 to ensure one-way flow of the high pressure fluid out of the cylinder 72 and into the first manifold 106.

In the example illustrated, a second manifold 112 distributes low pressure fluid to the cylinder 72. A return line 114 returns the low pressure fluid from the reservoir 102. A second check valve 116 may be connected between the second manifold 112 and the cylinder 72 to ensure one-way flow of the low pressure fluid out of the second manifold 112 and into cylinder 72.

The manifolds 106, 112, the lines 108, 114 and the check valves 110, 116 are also shown in FIG. 2. In FIG. 2, the manifolds 106, 112 include outlet couplings 118, 120, respectively, to facilitate detachable connection with the lines 108, 114, respectively.

Referring again to FIG. 8, the system 100 further includes an electrical power generator 122. The electrical power generator 122 is driven by fluid from the accumulator 104.

In use, the reservoir 102 may be maintained with a backpressure to bias the piston 74 of each of the energy collection devices 16 towards an advanced position. For example, the reservoir 102 may be maintained with a backpressure of about 10 bar. Thus, in some examples, the backpressure may be used to control the position of the piston 74 in the cylinder 72, without need for a return biasing element, such as spring, to urge the piston 74 to the retracted (raised) position. In other examples, suitable biasing elements, e.g., springs (not shown), may be used to urge the piston 74 to the retracted (raised) position.

The backpressure may be varied, as desired, to alter the effect that the energy collection devices 16 have on the train or vehicle travelling along the railroad track. In some examples, the backpressure may be set to a relatively low level, if the train travelling along the track is relatively light, and/or to minimize the impact of the energy collection devices 16 on the speed of the train. In some examples, the backpressure may be set to a relatively high level, to assist in deceleration of the train, or even to serve as an auxiliary emergency braking system, if there are sufficient numbers of the energy collection devices 16 positioned along a stretch of the railroad track. Furthermore, the system 100 may incorporate a variety of sensors (not shown) for detecting mass and/or speed of a passing train.

The generator 122 is shown to include a fluid-powered motor portion 124 that receives pressurized fluid from the accumulator 104. The motor portion 124 has an output shaft 126 coupled to an alternator portion 128 of the generator 122. The spent (depressurized) fluid is supplied from the generator 122 back to the reservoir 102.

The accumulator 104 provides a supply of pressurized fluid that may be used to perform useful work. In the example illustrated, this useful work is used to generate electricity via the generator 122. The electricity produced by the generator 122 may be fed into the area's electrical grid, recharge one or more batteries, or may be used to power various electricity consuming devices.

In some examples, the system may be adapted for use to perform work other than generating electricity. For instance, the accumulator may be used to drive a hydraulic motor that is coupled to an air compressor. The air compressor may then provide a source of pressurized air that may be used to power air tools, for example. Alternatively, or additionally, the energy collection devices may draw in low-pressure air, and deliver high-pressure air to an accumulator. This may eliminate the conversion of energy from compressed oil (or liquid) to compressed air where the system is configured to provide a supply of compressed air. In this case, ambient air may serve as a low-pressure fluid supply reservoir.

In further examples, the system may be adapted to be an "open loop" system, and used to pump water. In some examples, the system may be used to pump water from a nearby sea or lake, and may be further adapted to pass the water through a reverse osmosis unit or other type of filtration process to generate potable water or water for irrigation purposes.

Figure 9:
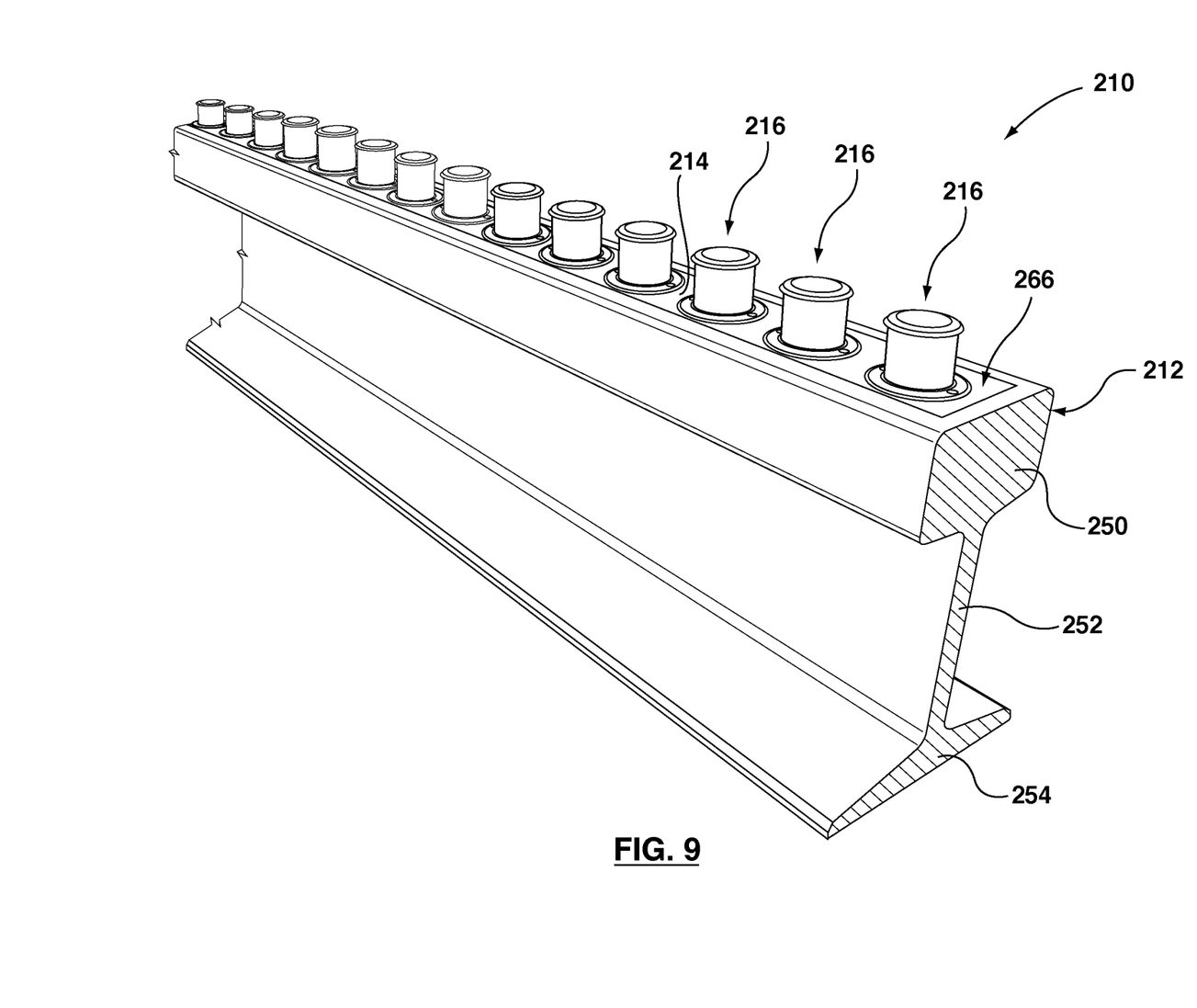
FIG. 9 is a perspective view of another energy harnessing apparatus.

Referring now to FIG. 9, another apparatus for harnessing kinetic energy is illustrated generally at reference numeral 210. In this example, the apparatus 210 includes a railroad track 212. A body 214 is embedded or otherwise incorporated within a head portion 250 of the railroad track 212, with a top surface 266 of the body 214 generally flush with an upper surface of the head portion 250. Thus, in this example, the apparatus 210 does not include a mounting assembly.

Energy collection devices 216 are installed lengthwise along the body 214 and the railroad track 212. In the example illustrated, a wheel (not shown) travelling along the railroad track 212 sequentially depresses the energy collection devices 216, and the energy collection devices 216 may convert kinetic energy from the wheel to potential energy in the form of high pressure fluid, as described herein. Although not shown, the apparatus 210 may further include a series of ports for collecting high pressure fluid and distributing low pressure fluid to the cylinders of the energy collection devices 216. These ports may be positioned along a bottom edge of the head portion 250 so that they do not interfere with the flange of the passing wheel.

While the above description provides examples of one or more methods or apparatuses, it will be appreciated that other methods or apparatuses may be within the scope of the accompanying claims.

We claim:

1. An apparatus for harnessing energy from a wheel travelling on a railroad track, comprising:
   an elongate body extending lengthwise along a body axis, the body comprising a top surface, a plurality of pockets spaced apart along the top surface in general alignment with the body axis, and a bottom surface;
   a plurality of energy collection devices, each of the energy collection devices installed in a respective one of the pockets of the body, and comprising an actuator extending proud of the top surface of the body; and
   a mounting assembly for releasably mounting the body adjacent to the railroad track so that the actuators of the energy collection devices are positioned in a path of the wheel to be actuated thereby,
   wherein the mounting assembly comprises at least one bracket connected to the body, and at least one first plate releasably connected to the bracket, the bracket and the first plate configured to clamp a base portion of the railroad track to fix the body relative to the railroad track,
   wherein the bracket and the first plate are configured to clamp the base portion at an opposite side of the railroad track from the body,
   wherein the bracket comprises a first end connected to the body, and a second end spaced apart from an inner side of the body to accommodate the railroad track therebetween,
   wherein the first end of the bracket is fastened to an outer side of the body,
   wherein the first plate is positionable relative to the second end of the bracket between an unclamped position, and a clamped position in which a vertical gap between a lower surface of the first plate and an upper surface of the bracket is decreased to bear against respective upper and lower surfaces of the base portion of the railroad track,
   wherein, in the clamped position, the lower surface of the first plate and the upper surface of the bracket are arranged to opposingly bear against the base portion of the railroad track,
   wherein the bottom surface of the body is configured to bear against an upper surface of the base portion on the other side of the railroad track from the first plate, and
   wherein the upper surface of the bracket is configured to connect at least partially with the lower surface of the base portion across its width.

2. The apparatus of claim 1, wherein the mounting assembly comprises a second plate secured to the second end of the bracket, and, in the clamped position, the first plate is fastened to the second plate.

3. The apparatus of claim 2, wherein an inner edge of the first plate is offset inwardly relative to the second plate, for bearing against the base portion of the railroad track.

4. The apparatus of claim 1, wherein the energy collection devices are configured to convert kinetic energy from the wheel to potential energy in the form of high pressure fluid.

5. The apparatus of claim 4, wherein each of the energy collection devices comprises a cylinder and a piston slidably mounted therein, the piston coupled to the respective actuator, and for each of the energy collection devices, the piston is movable between an advanced position in which an upper contact surface of the actuator is positioned in the path of the wheel and a retracted position in which the wheel depresses the upper contact surface.

6. The apparatus of claim 5, wherein, for each of the energy collection devices, the cylinder is formed by the respective pocket of the body.

7. The apparatus of claim 6, wherein each of the energy collection devices comprises a sleeve fixed to the respective pocket adjacent to the top surface of the body, the sleeve configured to guide the respective piston between the advanced and retracted positions.

8. The apparatus of claim 5, wherein an outer side of the body comprises, for each of the energy collection devices, an exhaust port for delivering the high pressure fluid from the cylinder and an intake port for receiving low pressure fluid into the cylinder.

9. The apparatus of claim 8, further comprising a first manifold in fluid communication with each of the cylinders to collect the high pressure fluid therefrom.

10. The apparatus of claim 9, wherein the first manifold comprises an outlet coupling to facilitate detachable connection with a supply line.

11. The apparatus of claim 9, further comprising, for each of the energy collection devices, a first check valve connected between the first manifold and the respective cylinder and configured to permit flow of the high pressure fluid out of the cylinder into the first manifold.

12. The apparatus of claim 8, further comprising:
a second manifold in fluid communication with each of the cylinders to distribute the low pressure fluid thereto, and the second manifold comprises an outlet coupling to facilitate detachable connection with a return line; and
for each of the energy collection devices, a second check valve connected between the second manifold and the respective cylinder and configured to permit flow of the low pressure fluid out of the second manifold into cylinder.

13. A system for harnessing kinetic energy from a wheel travelling on a railroad track, comprising:
at least one apparatus comprising a body, a plurality of energy collection devices installed in the body, each of the energy collection devices comprising an actuator, and a mounting assembly for releasably mounting the body adjacent to the railroad track so that the actuators of the energy collection devices are positioned in a path of the wheel to be actuated thereby;
a low pressure fluid supply reservoir; and
a high pressure fluid accumulator,
wherein the energy collection devices pump fluid from the reservoir to the accumulator upon actuation,
wherein the mounting assembly comprises at least one bracket connected to the body, and at least one first plate releasably connected to the bracket, the bracket and the first plate configured to clamp a base portion of the railroad track to fix the body relative to the railroad track,
wherein the bracket and the first plate are configured to clamp the base portion at an opposite side of the railroad track from the body,
wherein the bracket comprises a first end connected to the body, and a second end spaced apart from an inner side of the body to accommodate the railroad track therebetween,
wherein the first end of the bracket is fastened to an outer side of the body,
wherein the first plate is positionable relative to the bracket between an unclamped position, and a clamped position in which a gap between a lower surface of the first plate and an upper surface of the bracket is decreased to bear against respective upper and lower surfaces of the base portion of the railroad track,
wherein the bottom surface of the body is configured to bear against an upper surface of the base portion on the other side of the railroad track from the first plate, and
wherein the upper surface of the bracket is configured to connect at least partially with the lower surface of the base portion across its width.

14. An apparatus for harnessing energy from a wheel travelling on a railroad track, comprising:
an elongate body extending lengthwise, the body comprising a top surface, a plurality of pockets spaced apart along the top surface, and a bottom surface;
a plurality of energy collection devices, each of the energy collection devices installed in a respective one of the pockets of the body, and comprising an actuator extending proud of the top surface of the body; and
a mounting assembly for releasably mounting the body adjacent to the railroad track so that the actuators of the energy collection devices are positioned in a path of the wheel to be actuated thereby, the mounting assembly comprising at least one bracket for extending underneath the railroad track, the bracket comprising a first end connected to the body, a second end spaced apart from the first end to accommodate the railroad track therebetween, and an upper surface extending at least partially between the first and second ends, the mounting assembly further comprising at least one first plate releasably connected to the second end of the bracket, the first plate positionable relative to the bracket between an unclamped position, and a clamped position in which a vertical gap between a lower surface of the first plate and the upper surface of the bracket is decreased,
wherein the bracket and the first plate are configured to clamp the base portion at an opposite side of the railroad track from the body to fix the body relative to the railroad track,
wherein, in the clamped position, the lower surface of the first plate and the upper surface of the bracket are configured to opposingly bear against respective upper and lower surfaces of the base portion of the railroad track,
wherein the bottom surface of the body is configured to bear against an upper surface of the base portion on the other side of the railroad track from the first plate, and wherein the upper surface of the bracket is configured to connect at least partially with the lower surface of the base portion across its width.

* * * * *